United States Patent
Chen et al.

(10) Patent No.: US 7,991,112 B2
(45) Date of Patent: Aug. 2, 2011

(54) ARTICLE DETECTION APPARATUS AND A DETECTING METHOD

(75) Inventors: Zhiqiang Chen, Beijing (CN); Yuanjing Li, Beijing (CN); Yulan Li, Beijing (CN); Li Zhang, Beijing (CN); Wanlong Wu, Beijing (CN); Hua Peng, Beijing (CN); Yinong Liu, Beijing (CN); Zirao Zhao, Beijing (CN); Xuewu Wang, Beijing (CN); Shangmin Sun, Beijing (CN); Bin Sang, Beijing (CN); Hailin Wang, Beijing (CN); Quanwei Song, Beijing (CN); Jinyu Zhang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 109 days.

(21) Appl. No.: 12/342,531

(22) Filed: Dec. 23, 2008

(65) Prior Publication Data

US 2009/0168959 A1    Jul. 2, 2009

(30) Foreign Application Priority Data

Dec. 27, 2007 (CN) .......................... 2007 1 0304361

(51) Int. Cl.
*G01N 23/083* (2006.01)
*G01N 23/18* (2006.01)
*H05G 1/60* (2006.01)
(52) U.S. Cl. ............... 378/57; 378/16; 378/62; 378/901
(58) Field of Classification Search ............... 378/4–20, 378/57, 62, 901
See application file for complete search history.

(56) References Cited

U.S. PATENT DOCUMENTS 5,132,998 A    7/1992    Tsutsui et al. .................. 378/99
(Continued)

FOREIGN PATENT DOCUMENTS

CN    1305610    7/2001
(Continued)

OTHER PUBLICATIONS

"Combined Search and Examination Report under Sections 17 and 18(3)" for Application No. GB0818056.4 dated Feb. 9, 2009 from Intellectual Property Office, 6 pages.

(Continued)

*Primary Examiner* — Anastasia Midkiff
(74) *Attorney, Agent, or Firm* — Westman, Champlin & Kelly, P.A.

(57) ABSTRACT

The present invention discloses a detecting method of an article detection apparatus composed of an individual DR subsystem and an individual CT subsystem, the method comprising: obtaining a first projection data on ray attenuation coefficient by using the DR subsystem to project an A-layer of an article at a first projection angle, and obtaining a second projection data on ray attenuation coefficient by using the CT subsystem to project an A-layer of the article at a second projection angle different from the first projection angle; and judging whether an A-layer of the detected article contains a dangerous article based on the first projection data and the second projection data so as to obtain a first judgment on an A-layer of the detected article. In the present invention, by combining the projection data of the DR subsystem and the projection data of the CT subsystem, the amount of data information used to judge the detected article is greatly increased, therefore, both the detection accuracy and speed are improved.

10 Claims, 4 Drawing Sheets

U.S. PATENT DOCUMENTS

| | | | |
|---|---|---|---|
| 5,182,764 A * | 1/1993 | Peschmann et al. | 378/57 |
| 5,367,552 A | 11/1994 | Peschmann | 378/57 |
| 5,974,111 A * | 10/1999 | Krug et al. | 378/57 |
| 6,078,642 A | 6/2000 | Simanovsky et al. | 378/57 |
| 6,418,189 B1 | 7/2002 | Schafer | |
| 7,116,751 B2 | 10/2006 | Ellenbogen et al. | 378/57 |
| 7,634,061 B1 * | 12/2009 | Tumer et al. | 378/98.9 |
| 2005/0031075 A1 * | 2/2005 | Hopkins et al. | 378/57 |
| 2005/0259781 A1 * | 11/2005 | Ying et al. | 378/5 |
| 2005/0276468 A1 * | 12/2005 | Ying et al. | 382/154 |
| 2006/0098773 A1 * | 5/2006 | Peschmann | 378/57 |
| 2008/0304622 A1 * | 12/2008 | Morton | 378/51 |
| 2009/0092220 A1 * | 4/2009 | Chen et al. | 378/5 |
| 2009/0310744 A1 * | 12/2009 | Petch et al. | 378/53 |

FOREIGN PATENT DOCUMENTS

| | | |
|---|---|---|
| CN | 1319759 | 10/2001 |
| CN | 1779444 | 5/2006 |
| CN | 101071110 | 11/2007 |
| WO | WO 94/02839 | 2/1994 |

OTHER PUBLICATIONS

Search Report from related Application PCT/CN2008/001656, dated Jan. 8, 2009, 4 pages.

Office Action from U.S. Appl. No. 12/240,049, mailed Jul. 28, 2010.

* cited by examiner

ARTICLE DETECTION APPARATUS AND A DETECTING METHOD

The present application claims priority of Chinese patent application Serial No. 200710304361.5, filed Dec. 27, 2007, the content of which is hereby incorporated by reference in its entirety.

FIELD OF THE INVENTION

The present invention relates to an article detection apparatus and a detecting method, particularly, for detecting an explosive, a narcotic drug, or a weapon hidden in an article of luggage.

BACKGROUND OF THE INVENTION

After the terror event happened on Sep. 11, 2001 in the US, all countries are all attaching much more importance to the examination of the luggage of passengers than ever before.

Nowadays, there are two types of article detection apparatus used in railway stations and airports, one type being a DR (digital radiographic) detection apparatus, and the other being a CT (computer tomography) detection apparatus.

As we all know, the DR detection apparatus can obtain a two-dimensional projection image of the article to be examined, therefore, it can examine the articles at very high speed and can easily detect a dangerous metal article. However, since the two-dimensional projection image of the article contains relatively less information than a three-dimensional projection image of the article, the DR detection apparatus can not accurately judge whether there contains an explosive in an article of luggage.

Compared with the DR detection apparatus, the CT detection apparatus can rebuild a three-dimensional projection image of the article based on the projection data by using the CT rebuild arithmetic, therefore, the CT detection apparatus can accurately judge whether there contains the explosive in the luggage. However, the examination speed of the CT detection apparatus is very slow and can not satisfy the need of quickly detecting the luggage.

In order to accurately examine the luggage at high speed, a detection device having a DR apparatus and a CT apparatus recently was proposed. The detection device firstly performs prejudgment on the detected article at a relatively high speed by using the DR apparatus. If the result of the prejudgment indicates there may be a suspicious region where a dangerous article may be hidden in the luggage, then the CT apparatus performs re-judgment on the suspicious region so as to accurately and finally determine whether a dangerous article is hidden in the region. However, since the detection accuracy of the DR apparatus is very poor, the DR apparatus still misses some real dangerous articles or mistakes a safe article as a dangerous during the prejudgment.

SUMMARY OF THE INVENTION

The present invention is directed to solve at least one aspect of the aforesaid problems existing in prior arts.

One aspect of this invention is to provide a detecting method of an article detection apparatus composed of an individual DR subsystem and an individual CT subsystem independent of the individual DR subsystem, a DR scanning on an article performed by the DR subsystem and a CT scanning on the article performed by the CT subsystem both are accomplished once the article passes through the article detection apparatus in a transmission direction, the method comprising:

obtaining one group of first projection data on ray attenuation coefficient by using the DR subsystem to project an A-layer of the article at one first projection angle, and obtaining one group of second projection data on ray attenuation coefficient by using the CT subsystem to project the A-layer of the article at a one second projection angle different from the one first projection angle; and judging whether the A-layer of the detected article contains a dangerous article based on the one group of first projection data and the one group of second projection data so as to obtain a first judgment on the A-layer of the detected article.

Another aspect of this invention is to provide an article detection apparatus, comprising:

an individual DR subsystem;

an individual CT subsystem independent of the individual DR subsystem; and a judging device for judging whether the article to be detected is a dangerous article based on combination of a projection data of the DR subsystem and a projection data of the CT subsystem, wherein a DR scanning on an article performed by the DR subsystem and a CT scanning on the article performed by the CT subsystem both are accomplished once the article passes through the article detection apparatus in a transmission direction.

In the present invention, by combining the projection data of the DR subsystem and the projection data of the CT subsystem, the amount of data information used to judge the detected article is greatly increased, therefore, both the detection accuracy and speed are improved.

DETAILED DESCRIPTION OF EMBODIMENTS OF THE INVENTION

Figure 1:
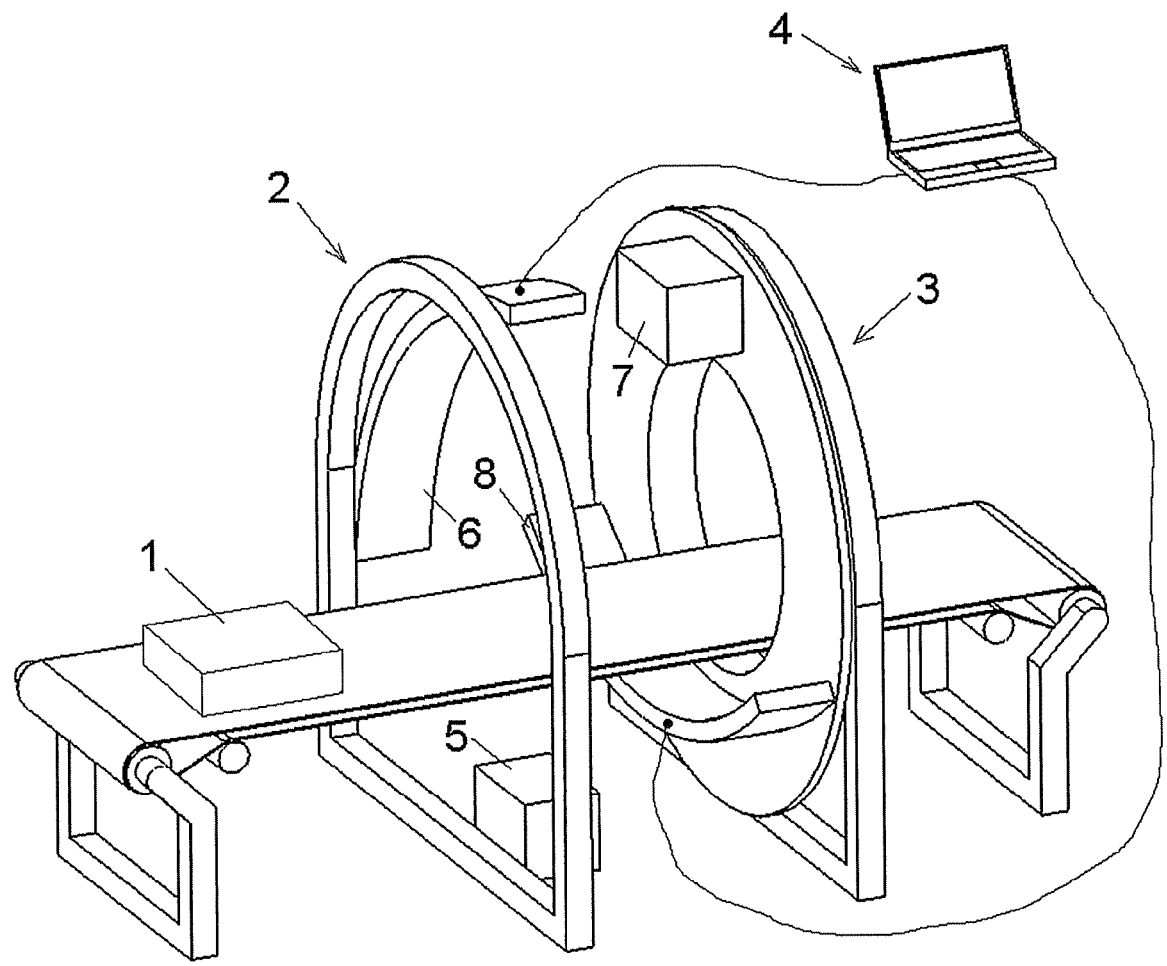
FIG. 1 is a schematic view showing an article detection apparatus according to one embodiment of the present invention.

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

The Embodiment of the Article Detection Apparatus

FIG. 1 shows the article detection apparatus according to one embodiment of the present invention.

As shown in FIG. 1, the article detection apparatus comprises an individual DR subsystem 2 and an individual CT subsystem 3. The DR subsystem 2 comprises a ray source 5 and a detector 6. The CT subsystem 3 comprises a ray source 7, a detector 8 and a sliding ring 9. Herein, because the individual DR subsystem and the CT subsystem 3 according to the present invention both are similar to those in the prior arts, herein the detailed structures of the DR subsystem 2 and the CT subsystem 3 are missed.

As shown in FIG. 1, the article detection apparatus of the present invention further comprises a judging device 4 connected to the detector 6 of the DR subsystem 2 and the detector 8 of the CT subsystem 3, for obtaining the projection data of the DR subsystem 2 and the projection data of the CT subsystem 3. After obtaining the projection data of the DR subsystem 2 and the projection data of the CT subsystem 3, the judging device 4 judges whether an article to be detected is a dangerous article based on combination data of the projection data of the DR subsystem 2 and the projection data of the CT subsystem 3.

Compared with the apparatus performing judgment based on only the projection data of the DR subsystem or based on only the projection data of the CT subsystem, the apparatus in the present invention, by combining the projection data of the DR subsystem and the projection data of the CT subsystem, improves both the detection accuracy and speed, for the amount of data information used to judge the detected article is greatly increased.

As shown in FIG. 1, the article 1 to be detected is placed on a transmit belt, and is subsequently scanned by the DR subsystem 2 and the CT subsystem 3.

Figure 2:
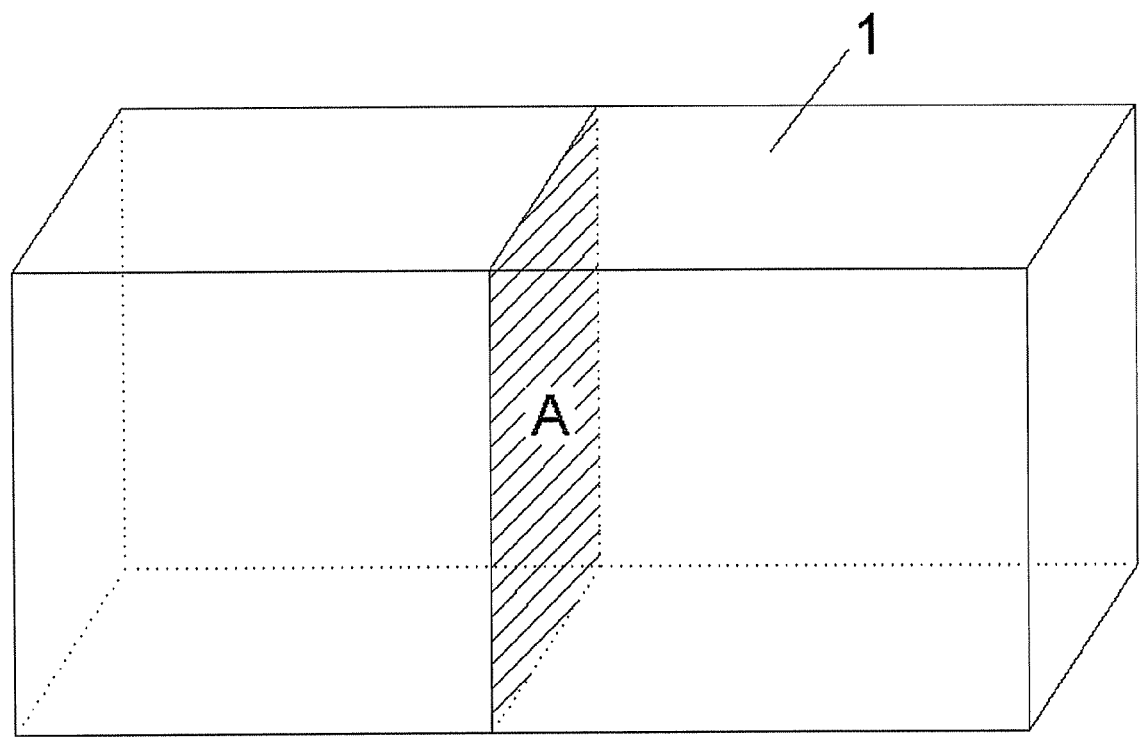
FIG. 2 is a schematic view showing an article with an A-layer to be projected.
Figure 3:
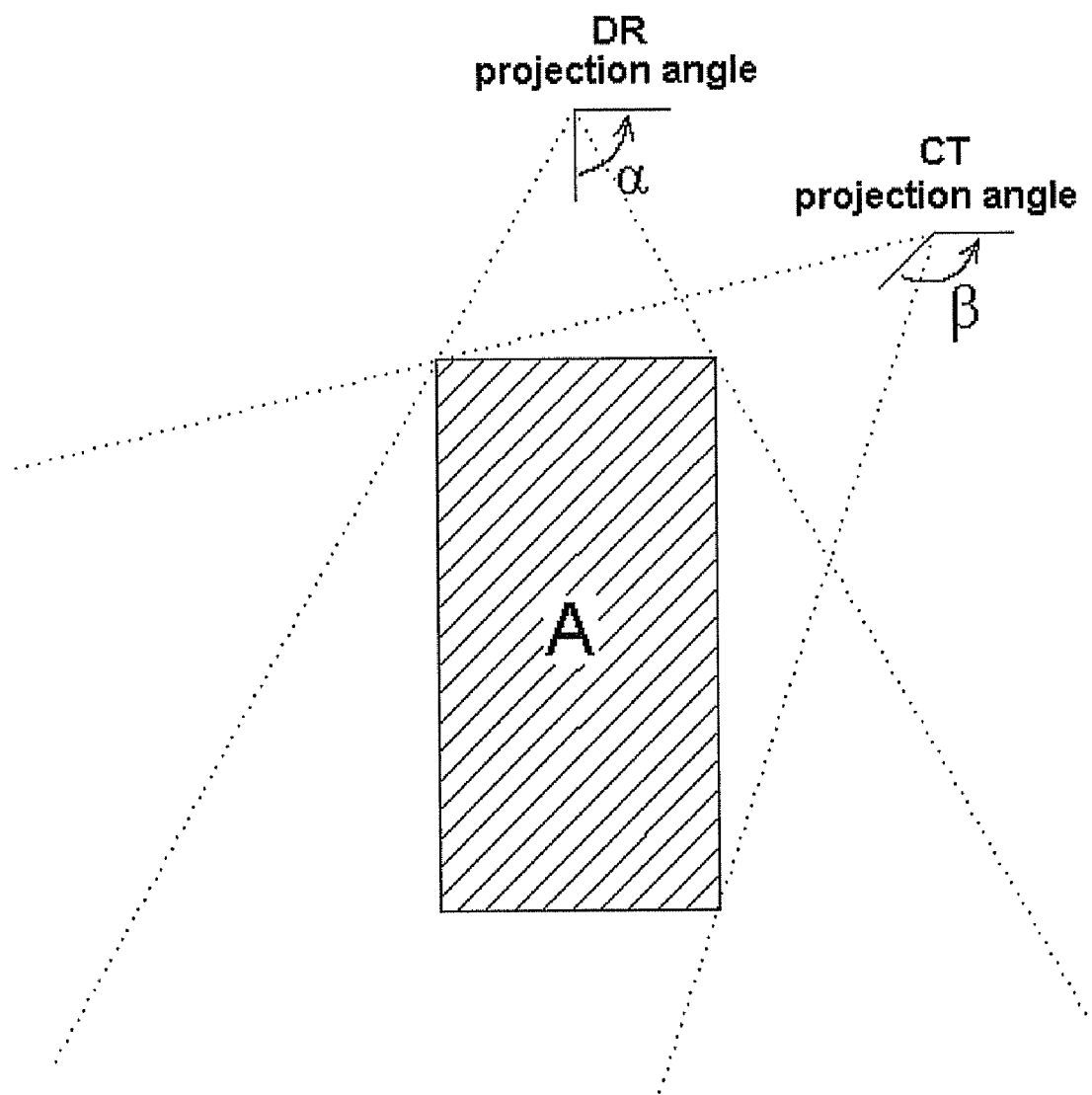
FIG. 3 is a schematic view showing the A-layer of the article being projected at two different projection angles.

FIG. 2 shows an A-layer of the article 1 to be projected. When the A-layer of the article 1 passes through the DR subsystem 2, the DR subsystem 2 will project the A-layer at a fixed projection angle a (please see FIG. 3). Thus, the distribution of the ray attenuation coefficient of the A-layer of the article 1 will be obtained by the DR subsystem 2 at the projection angle $\alpha$. Herein, the distribution of the ray attenuation coefficient of the A-layer refers to as a first projection data. When the A-layer of the article 1 then passes through the CT subsystem 3, the CT subsystem 3 will project the A-layer at a projection angle $\beta$ different from the projection angle $\alpha$ (please see FIG. 3). Please be noted that the projection of the CT subsystem 3 can be changed by rotating the sliding ring 9 on which the ray source 7 and the detector 8 are mounted. Thus, the distribution of the ray attenuation coefficient of the A-layer of the article 1 will be re-obtained by the CT subsystem 3 at the projection angle $\beta$. Herein, the re-obtained distribution of the ray attenuation coefficient of the A-layer refers to as a second projection data.

For the DR subsystem 2 and the CT subsystem 3 both project the same one A-layer of the article 1, two groups of projection data (i.e. the first projection data and the second projection data) on the same one A-layer are obtained, thus, the data information for judging the A-layer of the article is doubled, which will improve the accuracy of detection on the A-layer.

Figure 4:
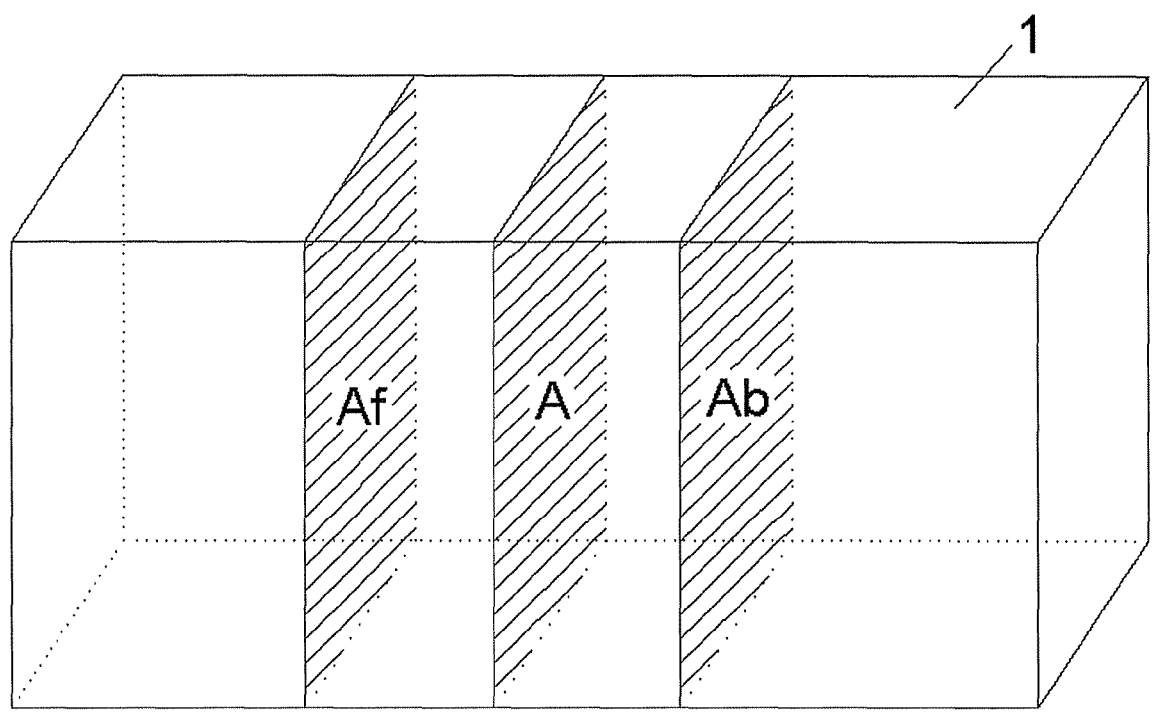
FIG. 4 is a schematic view showing the A-layer of the article having a group of projection layers from an Af-layer to an Ab-layer.

In addition, if rotating the sliding ring 9 of the CT subsystem to detect an area from an Af-layer to an Ab-layer of the article 1 (refer to FIG. 4), then the projection data from the Af-layer to the Ab-layer of the article can be obtained. As shown in FIG. 4, the A-layer is a middle layer between the Af-layer and the Ab-layer, that is, the distance from the Af-layer to the A-layer is equal to the distance from the A-layer to the Ab-layer. Furthermore, if the detector 8 of the CT subsystem 3 is a dual-energy detector, the CT subsystem 3 can obtain a dual-energy projection data from the A-layer to the Ab-layer, and rebuild the effective atomic number distribution of the A-layer based on the dual-energy projection data from the A-layer to the Ab-layer.

The First Detecting Method of the Article Detection Apparatus

According to the above article detection apparatus composed of an individual DR subsystem and an individual CT subsystem, a first detecting method is proposed, the method comprising: obtaining a first projection data on ray attenuation coefficient by using the DR subsystem to project the A-layer of an article at a first projection angle, and obtaining a second projection data on ray attenuation coefficient by using the CT subsystem to project the A-layer of the article at a second projection angle different from the first projection angle; and judging whether the A-layer of the detected article contains a dangerous article based on the first projection data and the second projection data so as to obtain a first judgment on the A-layer of the detected article.

Please be noted that, the first judgment is determined by combining the projection data of the DR subsystem and the projection data of the CT subsystem (i.e. combining the first projection data and the second projection data), thus, the data information for judging the A-layer of the article is doubled, which will improve the accuracy of detection on the A-layer.

The Second Detecting Method of the Article Detection Apparatus

According to the above article detection apparatus composed of an individual DR subsystem and an individual CT subsystem, a second detecting method is proposed, the method comprising:

obtaining a first projection data on ray attenuation coefficient by using the DR subsystem to project the A-layer of an article at a first projection angle, and obtaining a second projection data on ray attenuation coefficient by using the CT subsystem to project the A-layer of the article at a second projection angle different from the first projection angle; judging whether the A-layer of the detected article contains a dangerous article based on the first projection data and the second projection data so as to obtain a first judgment on the A-layer of the detected article;

obtaining a projection data from an Af-layer to an Ab-layer of the article, the A-layer is a middle layer between the Af-layer and the Ab-layer, that is, the distance from the Af-layer to the A-layer is equal to the distance from the A-layer to the Ab-layer; judging whether the A-layer of the detected article contains a dangerous article based on the projection data from the Af-layer to the Ab-layer so as to obtain a second judgment on the A-layer of the detected article; and determining a final judgment on whether the A-layer of the detected article contains a dangerous article based on the first judgment and the second judgment.

Please be noted that, the second judgment on the A-layer of the detected article is determined by using the projection data of all layers of an area adjacent to the A-layer, that is, the projection data from the Af-layer to the Ab-layer. Thus, the data information for judging the A-layer of the article is greatly increased, which will greatly improve the accuracy of detection on the A-layer.

In addition, please also be noted that the final judgment is determined based on the first judgment and the second judgment, therefore, the data information for the final judgment is further increased, which will further improve the accuracy of detection on the A-layer.

The Third Detecting Method of the Article Detection Apparatus

According to the above article detection apparatus composed of an individual DR subsystem and an individual CT subsystem having a dual-energy detector, a third detecting method is proposed, the method comprising:

obtaining a first projection data on ray attenuation coefficient by using the DR subsystem to project the A-layer of an article at a first projection angle, and obtaining a second projection data on ray attenuation coefficient by using the CT subsystem to project the A-layer of the article at a second projection angle different from the first projection angle; judging whether the A-layer of the detected article contains a dangerous article based on the first projection data and the second projection data so as to obtain a first judgment on the A-layer of the detected article;

obtaining a projection data from an Af-layer to an Ab-layer of the article, the A-layer is a middle layer between the Af-layer and the Ab-layer, that is, the distance from the Af-layer to the A-layer is equal to the distance from the A-layer to the Ab-layer; judging whether the A-layer of the detected article contains a dangerous article based on the projection data from the Af-layer to the Ab-layer so as to obtain a second judgment on the A-layer of the detected article;

obtaining a dual-energy projection data from the Af-layer to the Ab-layer of the article by using the CT subsystem; judging whether the A-layer of the detected article contains a dangerous article based on the dual-energy projection data from the Af-layer to the Ab-layer so as to obtain a third judgment on the A-layer of the detected article; and determining a final judgment on whether the A-layer of the detected article contains a dangerous article based on the first, the second and the third judgments.

Please be noted that, the third judgment on the A-layer of the detected article is determined by using the dual-energy projection data of all layers of an area adjacent to the A-layer, that is, the dual-energy projection data from the Af-layer to the Ab-layer. Thus, the data information for judging the A-layer of the article is greatly increased, which will greatly improve the accuracy of detection on the A-layer.

The Fourth Detecting Method of the Article Detection Apparatus

According to the above article detection apparatus composed of an individual DR subsystem and an individual CT subsystem, a fourth detecting method is proposed, the method comprising:

obtaining a first projection data on ray attenuation coefficient by using the DR subsystem to project the A-layer of an article at a first projection angle, and obtaining a second projection data on ray attenuation coefficient by using the CT subsystem to project the A-layer of the article at a second projection angle different from the first projection angle; judging whether the A-layer of the detected article contains a dangerous article based on the first projection data and the second projection data so as to obtain a first judgment on the A-layer of the detected article;

obtaining a projection data from an Af-layer to an Ab-layer of the article, the A-layer is a middle layer between the Af-layer and the Ab-layer, that is, the distance from the Af-layer to the A-layer is equal to the distance from the A-layer to the Ab-layer; judging whether the A-layer of the detected article contains a dangerous article based on the projection data from the Af-layer to the Ab-layer so as to obtain a second judgment on the A-layer of the detected article;

obtaining a projection data of all layers of the article by using the DR subsystem so as to obtain a two-dimensional projection image of the article, and judging whether the A-layer of the detected article contains a dangerous article based on the two-dimensional projection image so as to obtain a fourth judgment on the A-layer of the detected article; and determining a final judgment on whether the A-layer of the detected article contains a dangerous article based on the first, the second and the fourth judgments.

Please be noted that, the fourth judgment on the A-layer of the detected article is determined by using the two-dimensional projection image of the whole article. Thus, the data information for judging the A-layer of the article is greatly increased, which will greatly improve the accuracy of detection on the A-layer.

The Fifth Detecting Method of the Article Detection Apparatus

According to the above article detection apparatus composed of an individual DR subsystem and an individual CT subsystem having a dual-energy detector, a fifth detecting method is proposed, the method comprising:

obtaining a first projection data on ray attenuation coefficient by using the DR subsystem to project the A-layer of an article at a first projection angle, and obtaining a second projection data on ray attenuation coefficient by using the CT subsystem to project the A-layer of the article at a second projection angle different from the first projection angle; judging whether the A-layer of the detected article contains a dangerous article based on the first projection data and the second projection data so as to obtain a first judgment on the A-layer of the detected article;

obtaining a projection data from an Af-layer to an Ab-layer of the article, the A-layer is a middle layer between the Af-layer and the Ab-layer, that is, the distance from the Af-layer to the A-layer is equal to the distance from the A-layer to the Ab-layer; judging whether the A-layer of the detected article contains a dangerous article based on the projection data from the Af-layer to the Ab-layer so as to obtain a second judgment on the A-layer of the detected article;

obtaining a dual-energy projection data from the Af-layer to the Ab-layer of the article by using the CT subsystem; judging whether the A-layer of the detected article contains a dangerous article based on the dual-energy projection data from the Af-layer to the Ab-layer so as to obtain a third judgment on the A-layer of the detected article;

obtaining a projection data of all layers of the article by using the DR subsystem so as to obtain a two-dimensional projection image of the article, and judging whether the A-layer of the detected article contains a dangerous article based on the two-dimensional projection image so as to obtain a fourth judgment on the A-layer of the detected article; and determining a final judgment on whether the A-layer of the detected article contains a dangerous article based on the first, the second, the third and the fourth judgments.

Other Alternative Embodiments

As mentioned above, the first to the fifth detecting methods have been described in detail.

However, the present invention also can include other detecting methods apart from the first to the fifth detecting methods mentioned above. For example, a sixth detecting method comprising the first judgment and the third judgment; a seventh detecting method comprising the first judgment and the fourth judgment; a eighth detecting method comprising the first judgment, the third judgment and the fourth judgment.

For these detecting methods each comprising the first judgment, it is obvious for those skilled that any detecting method comprising the first judgment according to the present invention will be fallen in the scope of the present invention.

Although several exemplary embodiments have been shown and described, it would be appreciated by those skilled in the art that various changes or modifications may be made in these embodiments without departing from the principles and spirit of the invention, the scope of which is defined in the claims and their equivalents.

What is claimed is:

1. A detecting method of an article detection apparatus composed of an individual DR subsystem and an individual CT subsystem independent of the individual DR subsystem, a DR scanning on an article performed by the DR subsystem and a CT scanning on the article performed by the CT subsystem both are accomplished once the article passes through the article detection apparatus in a transmission direction, the method comprising:

obtaining one group of first projection data on a ray attenuation coefficient by using the DR subsystem to project an A-layer of the article at a first single projection angle, and obtaining one group of second projection data on the ray attenuation coefficient by using the CT subsystem to project the A-layer of the article at a second single projection angle different from the first single projection angle; and judging whether the A-layer of the detected article contains a dangerous article based on the one group of first projection data and the one group of second projection data so as to obtain a first judgment on the A-layer of the detected article.

2. The method as claimed in claim 1, further comprising:

obtaining a projection data from an Af-layer to an Ab-layer of the article, wherein the A-layer is a middle layer between the Af-layer and the Ab-layer, that is, the distance from the Af-layer to the A-layer is equal to the distance from the A-layer to the Ab-layer; and judging whether the A-layer of the detected article contains a dangerous article based on the projection data from the Af-layer to the Ab-layer so as to obtain a second judgment on the A-layer of the detected article.

3. The method as claimed in claim 2, further comprising:

determining a final judgment on whether the A-layer of the detected article contains a dangerous article based on the first judgment and the second judgment.

4. The method as claimed in claim 2, wherein the CT subsystem has a dual-energy detector, the method further comprising:

obtaining dual-energy projection data from the Af-layer to the Ab-layer of the article by using the CT subsystem;

judging whether the A-layer of the detected article contains a dangerous article based on the dual-energy projection data from the Af-layer to the Ab-layer so as to obtain a third judgment on the A-layer of the detected article.

5. The method as claimed in claim 4, further comprising:

determining a final judgment on whether the A-layer of the detected article contains a dangerous article based on the first, the second and the third judgments.

6. The method as claimed in claim 2, further comprising:

obtaining projection data of all layers of the article by using the DR subsystem so as to obtain a two-dimensional projection image of the article, and judging whether the A-layer of the detected article contains a dangerous article based on the two-dimensional projection image so as to obtain a third judgment on the A-layer of the detected article.

7. The method as claimed in claim 6, further comprising:

determining a final judgment on whether the A-layer of the detected article contains a dangerous article based on the first, the second and the third judgments.

8. The method as claimed in claim 4, further comprising:

obtaining projection data of all layers of the article by using the DR subsystem so as to obtain a two-dimensional projection image of the article, and judging whether the A-layer of the detected article contains a dangerous article based on the two-dimensional projection image so as to obtain a fourth judgment on the A-layer of the detected article.

9. The method as claimed in claim 8, further comprising:

determining a final judgment on whether the A-layer of the detected article contains a dangerous article based on the first, the second, the third and the fourth judgments.

10. The method as claimed in claim 1, wherein the DR subsystem has a dual-energy detector.

* * * * *